US006636426B2

(12) United States Patent
Inman

(10) Patent No.: US 6,636,426 B2
(45) Date of Patent: Oct. 21, 2003

(54) LCD DISPLAY BRACKET SHARED WITH DISK BAY

(75) Inventor: Timothy P. Inman, West Columbia, SC (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 09/822,895

(22) Filed: Mar. 30, 2001

(65) Prior Publication Data

US 2002/0141162 A1 Oct. 3, 2002

(51) Int. Cl.[7] .................................................. H05K 7/00
(52) U.S. Cl. ........................ 361/724; 361/685; 361/825; 248/200
(58) Field of Search ................................ 361/679–686, 361/724–727, 825; 248/200, 917

(56) References Cited

U.S. PATENT DOCUMENTS

| 4,983,951 | A | * | 1/1991 | Igarashi et al. ............. 340/461 |
| 5,173,686 | A | | 12/1992 | Fujihara |
| 5,673,029 | A | * | 9/1997 | Behl et al. ................... 340/635 |
| 6,144,549 | A | | 11/2000 | Moss et al. |
| 6,388,878 | B1 | * | 5/2002 | Chang ......................... 361/687 |

* cited by examiner

Primary Examiner—Jayprakash N. Gandhi
(74) Attorney, Agent, or Firm—Blakely, Sokoloff, Taylor & Zafman LLP

(57) ABSTRACT

A bracket arrangement which allows a display and a drive to share the same front space of a device is disclosed. Particularly, the bracket mounted with a display is placed in front of the drive and can be pivoted out of the way to give access to the drive. Therefore, the bracket arrangement provides a way to implement a display in devices with a limited front space.

28 Claims, 4 Drawing Sheets

LCD DISPLAY BRACKET SHARED WITH DISK BAY

BACKGROUND OF THE INVENTION

1. Field of the Invention

The invention is related to peripheral devices, and more particularly to a bracket by which a display shares a front space with removable media device or device.

2. Description of the Related Art

As technology advances, computer systems are becoming more compact, allowing the computer system to be easily transported and/or requiring less room. While the smaller size may be convenient to users, the smaller size leaves little or no space on the front of the system for peripheral devices. Particularly, it may be difficult to assign the space needed for a display on the front of the system.

For example, a server often requires a display to communicate information to a user. However, due to a limited space, implementing a display on the front of a server chassis can be difficult. As a result, the server must either omit a display, or reduce and/or eliminate other peripheral devices.

BRIEF DESCRIPTION OF THE DRAWINGS

The invention will be described in detail with reference to the following drawings in which like reference numerals refer to like elements wherein.

DETAILED DESCRIPTION OF THE INVENTION

In the following description, specific embodiments are given to provide a thorough understanding of the present invention and not to limit the invention. Also, some details are omitted in order not to obscure the present invention in unnecessary detail. However, it will be obvious to those skilled in the art that the present invention may be practiced without such specific details.

Moreover, certain terminologies are used to discuss features of the invention. For example, the term "bay tray" refers to a space for housing one or more drives in a device. Here, a drive may be any apparatus used for reading and/or writing data on a media. Examples of a drive includes, but is not limited to a hard disk drive, a floppy disk drive, an optical disk drive, a compact disc (CD) drive, a digital video or versatile disc (DVD) drive, or tape drive. Also, the term "device" may refer to any machine or component, such as a personal computer or a server, having at least one processor and one bay area for housing a drive.

Furthermore, the term "removable drive" refers to a non-stationary drive which can physically be moved out of the bay tray. Therefore, access to a removable drive means being able to move the removable drive itself out of the bay tray. The term "removable media drive" refers to a drive into which a removable media can be loaded/unloaded. Therefore, access to a removable media drive means allowing access to the removable media by, for example, moving the removable media out toward a user. Finally, the term "bracket" refers to any structural support that can be attached to a bay tray and on which another device such as display can be mounted.

Generally, the invention allows a display to share the same front space with one or more drive(s). Namely, a bracket arrangement in accordance to the invention mounts a display on a bracket and positions the bracket in front of at least one drive housed in a device bay or chassis, thereby using the same area of the device bay. Here, a display may be a flat panel display such as a liquid crystal display (LCD), a light emitting diode (LED) display or any other display that can be mounted on a bracket. The bracket then pulls out of the way, for example by dropping down, to allow access to the drive(s).

The invention will next be discussed in more detail with reference to the figures. For purposes of explanation, and not intended to limit the scope, the invention is described using a removable media drive. It will be obvious to those skilled in the art that the invention can also be applied to removable drives and other devices that requires movement to/from a device bay.

Figure 1:
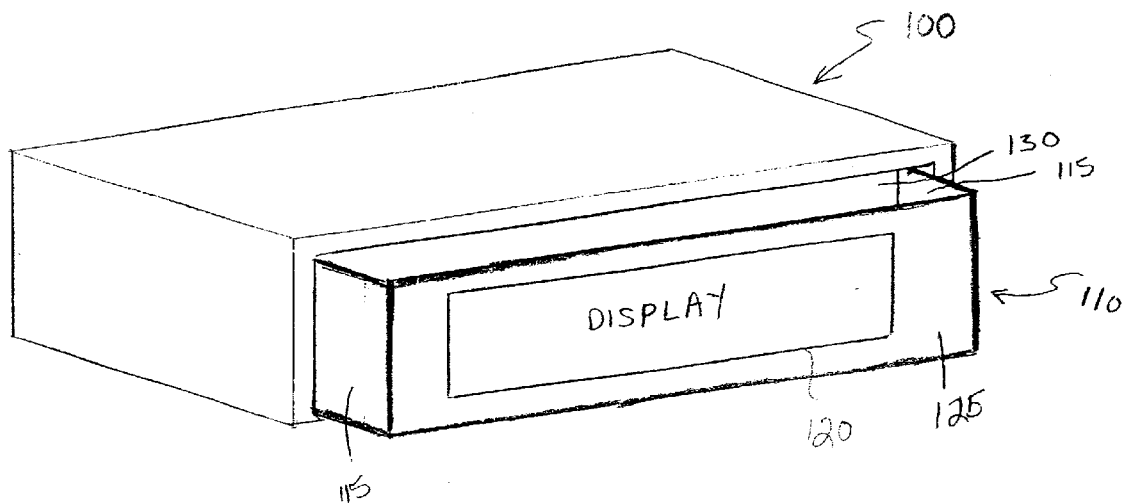
FIGS. 1–3 show exemplary embodiments of a bay tray in accordance with the invention.

For example, FIG. 1 shows an exemplary embodiment of a bay tray 100 which allows a bracket 110 and a removable media drive 130 to share a front panel. The bracket 110, including side panels 115 and a display 120 mounted on the front panel 125, is slidably coupled to the bay tray 100. In a retracted position, the front panel 125 of the bracket 110 serves as the front panel of the bay tray 100. To access the removable media drive 130 housed in the bay tray 100, the bracket 110 is moved forward and out of the way of the removable media drive 130. When access to the removable media drive 130 is no longer needed, the bracket 110 is retracted back into the bay tray 100, thereby serving as a front panel and display to communicate information to a user through the display 120.

Figure 2:
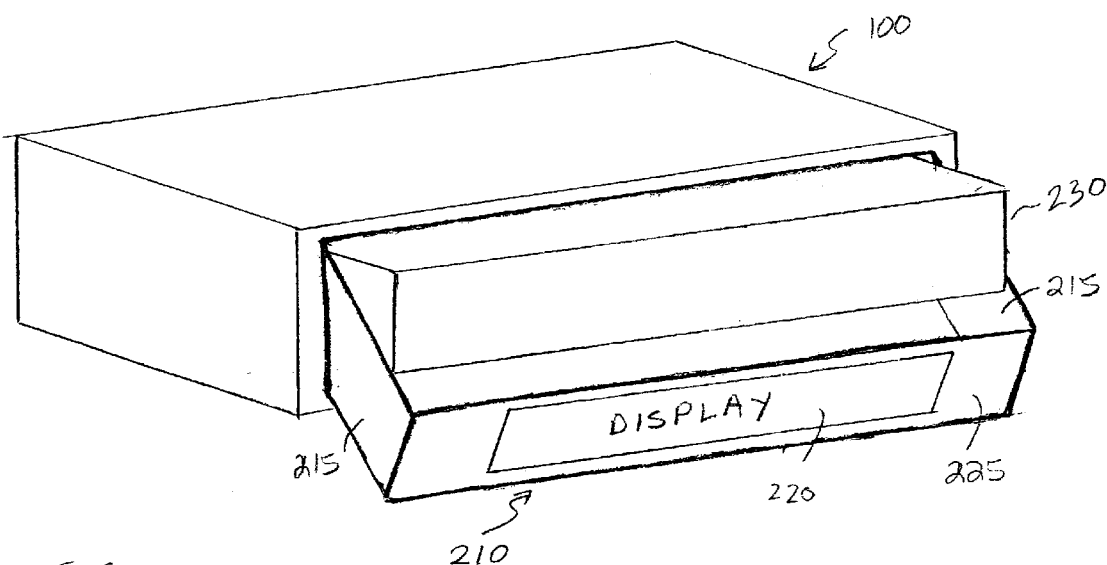

One embodiment, in particular as shown in FIG. 2, allows a user to slide forward a bracket 210 and to pivotally rotate the bracket 210 downward, thereby giving access to a removable media drive 230 housed in the bay tray 100. When the bracket 210, including side panels 215 and a display 220 mounted on a front panel 225, is moved forward enough, the bracket 210 can sufficiently be pivoted downward to give access to the removable media drive 230. The amount by which the bracket 210 should be moved forward depends upon the dimensions of the bay tray 100 and the bracket 210.

Figure 3:
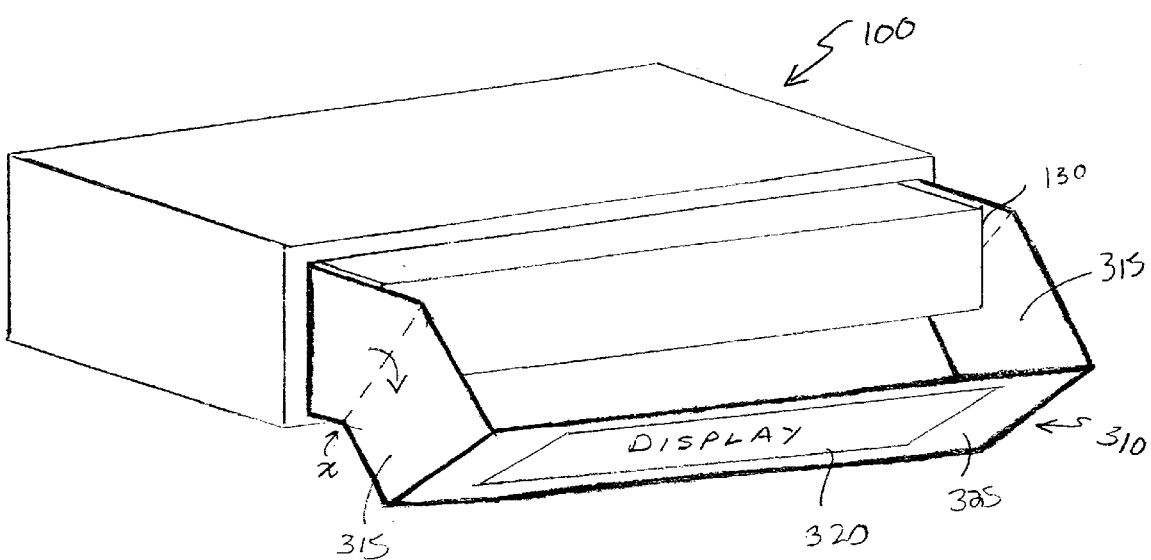

FIG. 3 shows another embodiment in which a user slides forward a bracket 310 and moves the bracket 310 downward to access a removable media drive 330 housed in the bay tray 100. In this embodiment, the bracket 310, including side panels 315 and a display 320 mounted on a front panel 325, is pivotally rotated downward at a point x on the side panels 315. Here, the bracket 310 is moved forward enough such that the side panels 315 of the bracket 310 can sufficiently be pivoted downward to give access to the removable media drive 330.

Figure 4A:
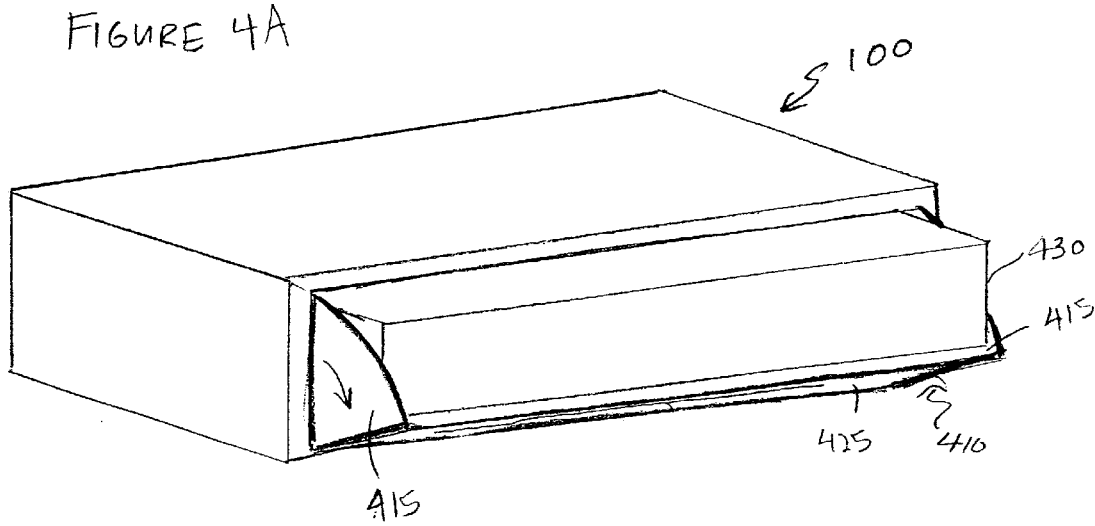
FIGS. 4A and 4B show exemplary embodiments of a bay tray in accordance with the invention.
Figure 4B:
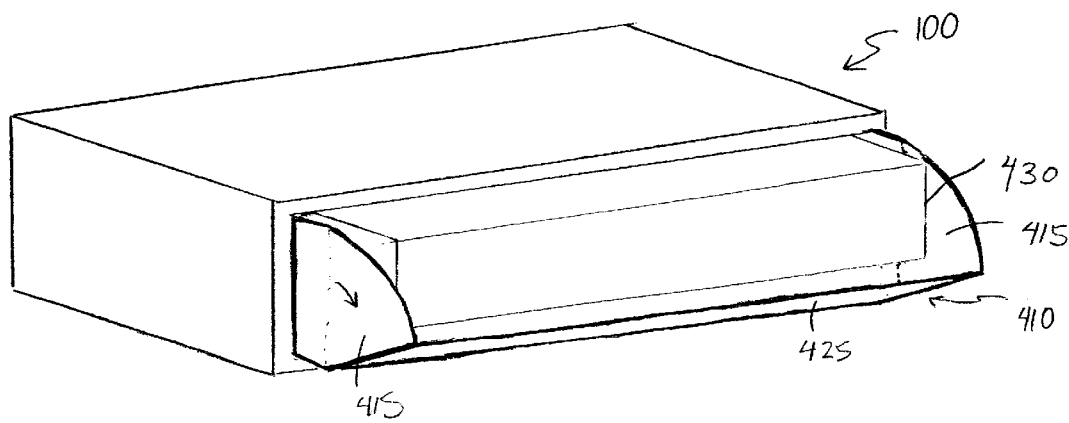

FIG. 4A shows another embodiment in which a user pivots a bracket 410 downward to access a removable media drive 430. The bracket 410 includes side panels 415 and a display (not shown) mounted on a front panel 425. Here, the front panel 425 of the bracket 410 is essentially pivotally rotated downward to give access to the removable media drive 430 housed in the bay tray 100. The front panel 425 of the bracket 410 can also be pivoted downward after moving forward the bracket 410, as shown in FIG. 4B.

Note, the figures described above are not drawn to scale and are not intended to limit the size or form of the elements as illustrated. It will be obvious to those skilled in the art that the invention can apply to many alternative shapes and forms of the bay tray, bracket and drive. For example, the removable media drive 130, 230, 330, and 430 may be a combination of a plurality of drives.

Also, the display mounted on the front panel of a bracket displays information to users by interface electronics that can be located within the bracket. For example, cables and/or wires can be used to transmit data to the display, where the cables and/or wires allow the bracket to be moved out of the way of the removable media drive. Also, the bracket may include a bottom mounted with a circuit board to transmit data to the display. Similarly, power can be provided to the display by using cables, wires, and/or circuit board as with the data transmission, or by using a battery.

Moreover, a variety of different mounting means can be used to slidably couple or connect a bracket to a bay tray. For example, the bracket may include rails at the side panels, either at the face of the side panels or the top and bottom of the side panels. Alternatively, the bay tray may include the rails while the bracket may include wheels or balls at the side panel to roll and/or glide against the rails. On the other hand, the bracket may slidably be coupled to the bay tray without the use of any additional features. In such case, a user can simply pull the bracket by exerting force greater than the friction between the bay tray and the bracket.

Figure 5A:
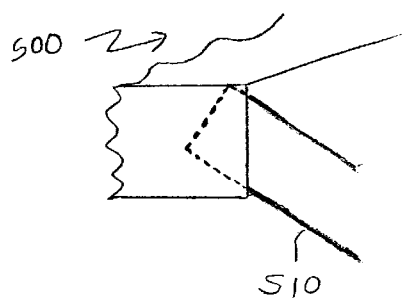
FIGS. 5A–5D show exemplary embodiments of a pivotal joint.
Figure 5B:
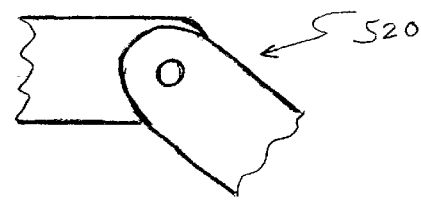
Figure 5C:
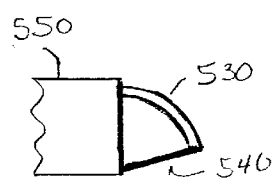
Figure 5D:
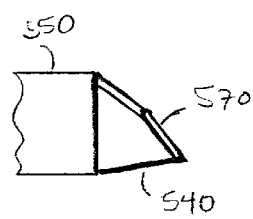

Also, a bracket can be pivotally coupled or connected to a bay tray using any appropriate coupling means, which directly or indirectly allow pivoting; the coupling means including but not limited to, pins, axles, bearings, hinges and shafts. FIGS. 5A–5D illustrate some embodiments of pivotal joints which can be used to implement the invention. A bracket 510 can be pivoted as allowed by the dimensions of a bay tray 500, as shown in FIG. 5A. This type can be used to implement the bracket arrangement in FIG. 2. FIG. 5B shows a bracket 520 with pivotal joints using a pin and can be used to implement the bracket arrangements in FIGS. 2 and 3. Moreover, FIGS. 5C and 5D show pivotal joints 530 and 570 by which a front panel 540 of a bracket 550 can be slid downward. These types of joints can be used to implement bracket arrangements such as shown in FIGS. 4A and 4B.

In addition to the embodiments described above, the front of the bracket may optionally include a means such as a handle, a bar, or an electronic key by which a user can use to manually or automatically pull the bracket out of the way of the removable media drive. The front of the bracket may include other features, for example an input key panel, depending upon the limitation and needs of the system. Also, rather than pivoting downward as shown in FIGS. 2–4, the bracket may be pivoted upward and out of the way of the removable media drive. In such case, the pivot should have enough friction or a catch to hold the bracket upward in place, despite the pull downward due to the weight of the bracket. Furthermore, the bracket may be coupled to the bay tray in such way that by pulling the bracket, the bay tray with the removable media drive housed therein is automatically pulled forward, giving easier access to the removable drive.

As described above, a bracket arrangement in accordance to the invention allows a display and a device, such as a removable drive or removable media drive, to share a front space. Accordingly, the bracket arrangement can be implemented in a number of different devices with a limited front space. Particularly, the bracket arrangement can be implemented in a server including at least a processor and a drive coupled to the processor.

Figure 6:
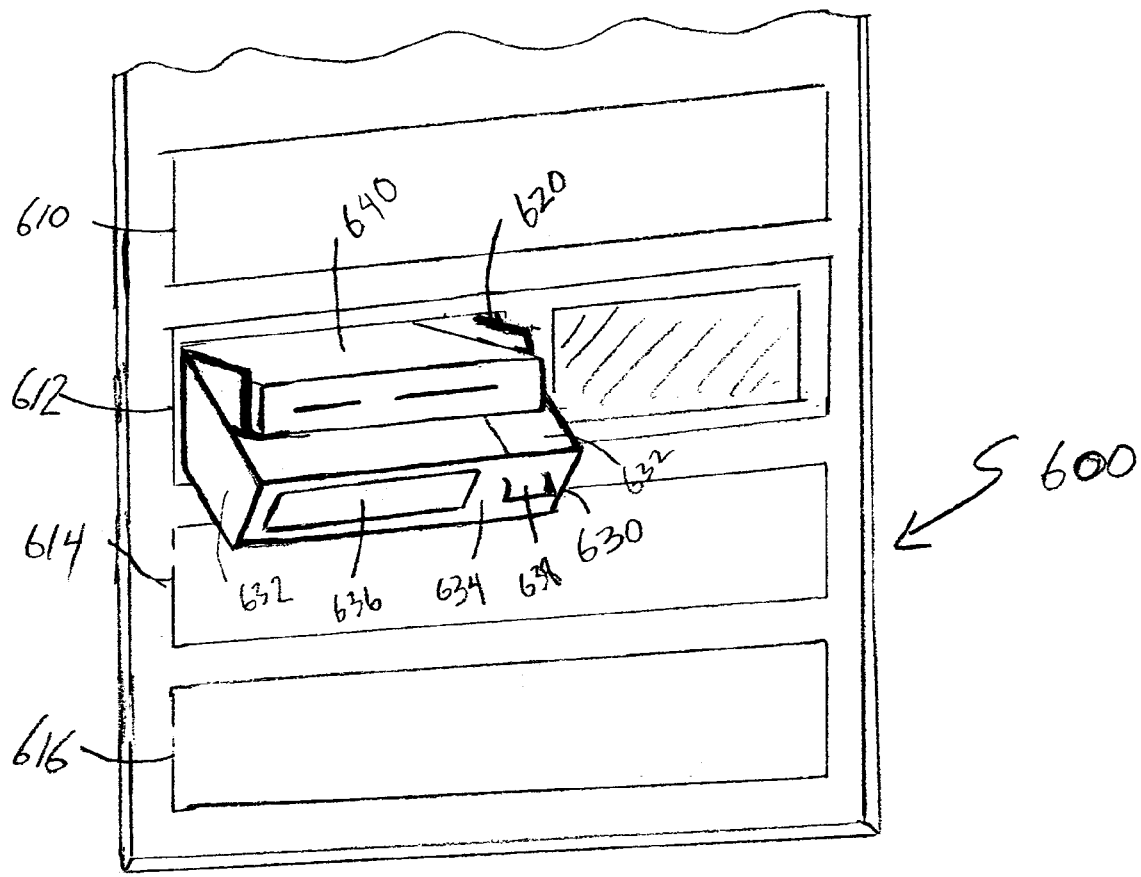
FIG. 6 shows an exemplary embodiment of a server in accordance with the invention.

Referring to FIG. 6, a front portion of a server 600 including a plurality of bays 610–616 or chassis, where bay 612 supports a bracket arrangement in accordance with the invention. The bay 612 includes a bay tray 620, a bracket 630 and a drive 640, either removable drive or removable media drive. The bracket 630 is slidably coupled to the bay tray 620 and can pivot downward to give access to the drive 640. As shown, the bracket 630 in a pivoted downward position includes side panels 632 and a front panel 634. Here, the front panel 634 includes a display 636 and a handle 638. Accordingly, the bracket arrangement gives users access to the drive 640 and when access is no longer needed, the bracket 630 can be retracted to be used as a display panel for users.

By placing a display in front of a device, for example a drive, additional space is not required on the front of a display. Therefore, a display can easily be implemented in a device with a limited front space. Finally, the bracket arrangement described above is merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device comprising:
  a bay tray having a drive;
  a bracket coupled to the bay tray and positioned in front of the drive to allow access to the drive when pivotally rotated; and
  a display mounted on a portion of the bracket to display information.

2. The device of claim 1, wherein the drive is a removable drive and the bracket pivots to allow the removable drive to be moved out of the bay tray.

3. The device of claim 1, wherein the bracket is pivotally rotated downward when accessing the drive.

4. The device of claim 1, wherein the bracket is pivotally rotated upward when accessing the drive.

5. The device of claim 1, wherein the drive is at least one of a hard disk drive, a floppy disk drive, an optical disk drive, or tape drive.

6. The device of claim 1, wherein the display is a liquid crystal display.

7. The device of claim 1, wherein the bracket includes a handle to pivot the bracket.

8. The device of claim 1, wherein the bracket is slidably coupled to the bay, the bracket to slide out and pivot when accessing the drive.

9. A device comprising:
  means for housing a drive;
  means for allowing access to the drive when pivotally rotated, the means for allowing access being coupled to a bay tray and positioned in front of the drive; and
  means for displaying information mounted on a portion of a bracket which serves as the front panel of the means for housing.

10. The device of claim 9, wherein the drive is a removable drive and the means for coupling allows the removable drive to be moved out of the means for housing when accessing the drive.

11. The device of claim 9, wherein the means for coupling allows the bracket to pivot downward when accessing the drive.

12. A server comprising:
   a processor;
   a drive coupled to the processor; and
   a chassis supporting a bay tray to house the drive, the bay tray including:
      a bracket coupled to the bay tray and positioned in front of the drive to allow access to the drive when pivotally rotated; and
      a display mounted on a portion of the bracket to display information.

13. The server of claim 12, where the bay tray houses a removable drive.

14. The server of claim 12, wherein the bracket is to pivot downward when accessing the drive housed in the bay tray.

15. The server of claim 12, wherein the bracket is slidably coupled to the bay tray, the bracket to slide and pivot when accessing the drive.

16. The server of claim 12, wherein the bracket includes a handle to pivot the bracket.

17. A device comprising:
   a bay tray to house a removable drive;
   a bracket coupled to and serving as a front panel of the bay tray and positioned in front of the removable drive, the bracket slidably and pivotally coupled to slide and pivot when accessing a removable drive housed in the bay tray; and
   a display mounted on the portion of the bracket which serves as the front panel of the bay tray.

18. The device of claim 17, wherein the display is a liquid crystal display.

19. The device of claim 17, wherein the bracket is to slide and pivot downward when accessing a removable drive housed in the bay tray.

20. The device of claim 17, wherein the bracket is to slide and pivot upward when accessing a removable drive housed in the bay tray.

21. The device of claim 17, wherein the bracket includes a handle to slide and pivot the bracket.

22. A method comprising:
   (a) housing a drive in a bay;
   (b) mounting a display on a front panel of a bracket, the bracket being positioned in front of the drive; and
   (c) pivotally rotating the bracket to access the drive.

23. The method of claim 22, wherein having comprised, housing a removable drive and pivotally rotating comprises pivoting the bracket to allow the removable drive to be moved out of the bay.

24. The method of claim 22, wherein pivotally rotating comprises, pivoting the bracket downward when accessing the drive.

25. The method of claim 22, wherein pivotally rotating comprises, pivoting the bracket upward when accessing the drive.

26. The method of claim 22, further comprising sliding the bracket before pivotally rotating the bracket when accessing the drive.

27. A method comprising:
   (a) mounting a display on a bracket, the bracket being positioned in front of the removable drive;
   (b) allowing access to the removable drive by pivotally rotating the bracket; and
   (c) moving the bracket out of the way of the removable drive when accessing the drive sliding and pivoting the bracket downward when accessing the removable drive by sliding and pivoting the bracket downward when accessing the removable drive.

28. The method of claim 27, further comprises, pivoting the bracket upward when accessing the removable drive.

* * * * *

UNITED STATES PATENT AND TRADEMARK OFFICE
CERTIFICATE OF CORRECTION

PATENT NO.    : 6,636,426 B2
DATED         : October 21, 2003
INVENTOR(S)   : Inman It is certified that error appears in the above-identified patent and that said Letters Patent is hereby corrected as shown below:

<u>Column 6,</u>
Line 9, delete "having comprised,", insert -- housing comprises --.

Signed and Sealed this

Eleventh Day of May, 2004

JON W. DUDAS
*Acting Director of the United States Patent and Trademark Office*